(12) United States Patent
Fukumoto

(10) Patent No.: US 9,859,672 B2
(45) Date of Patent: Jan. 2, 2018

(54) ELECTRIC MACHINE AND CONNECTING UNIT FOR AN ELECTRIC MACHINE

(71) Applicant: Continental Automotive GmbH, Hannover (DE)

(72) Inventor: Isao Fukumoto, Berlin (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 97 days.

(21) Appl. No.: 15/023,787

(22) PCT Filed: Sep. 18, 2014

(86) PCT No.: PCT/EP2014/069936
§ 371 (c)(1),
(2) Date: Mar. 22, 2016

(87) PCT Pub. No.: WO2015/044034
PCT Pub. Date: Apr. 2, 2015

(65) Prior Publication Data
US 2016/0233636 A1  Aug. 11, 2016

(30) Foreign Application Priority Data
Sep. 24, 2013  (DE) .................. 10 2013 219 186

(51) Int. Cl.
*H01R 39/08* (2006.01)
*H01R 39/12* (2006.01)
(Continued)

(52) U.S. Cl.
CPC ........... *H01R 39/12* (2013.01); *H01R 39/381* (2013.01); *H01R 39/383* (2013.01); *H02K 11/40* (2016.01);
(Continued)

(58) Field of Classification Search
CPC ...... H02K 11/40; H02K 5/1732; H01R 39/08; H01R 39/00; H01R 39/14; H01R 39/18; H01R 39/34
(Continued)

(56) References Cited

U.S. PATENT DOCUMENTS 2,393,900 A    1/1946  Guertin ......................... 384/624
4,088,914 A *  5/1978  Aoki ....................... H02K 1/26
                                                         310/237

(Continued)

FOREIGN PATENT DOCUMENTS

CN    1402415 A      3/2003  ............. G11B 19/20
CN    101010854 A    8/2007  ............. H02K 5/173
(Continued)

OTHER PUBLICATIONS

German Office Action, Application No. 102013219186.3, 7 pages, dated Apr. 16, 2014.
(Continued)

*Primary Examiner* — Thanh Lam
(74) *Attorney, Agent, or Firm* — Slayden Grubert Beard PLLC

(57) ABSTRACT

The present disclosure teaches an electric machine including a housing for receiving a rotor unit and a connecting unit. The rotor unit may rotate around an axis of rotation and have a rotor shaft and a first sliding surface. The connecting unit may include a carrier, a contact part, and a spring part. The carrier part may be made of an electrically conductive material and at least partially surround the rotor shaft and is firmly connected to the housing. The contact part may be made of an electrically conductive material, including a second sliding surface. The spring part may be made of an electrically conductive material, at least partially surrounding the rotor shaft. The spring part may be firmly connected
(Continued)

to the carrier part and the contact part and press the contact part against the first sliding surface so the sliding surfaces form the electrically conductive sliding contact.

10 Claims, 3 Drawing Sheets

(51) Int. Cl.
*H02K 11/40* (2016.01)
*H01R 39/38* (2006.01)
*H02K 13/00* (2006.01)
*H02K 5/173* (2006.01)
*F16C 41/00* (2006.01)

(52) U.S. Cl.
CPC ............ *H02K 13/00* (2013.01); *F16C 41/002* (2013.01); *F16C 2380/26* (2013.01); *H02K 5/1732* (2013.01)

(58) Field of Classification Search
USPC ............................ 310/90, 231–233, 237, 225
See application file for complete search history.

(56) References Cited

U.S. PATENT DOCUMENTS

| 4,515,417 | A | | 5/1985 | Shiraishi | 384/445 |
|---|---|---|---|---|---|
| 5,914,547 | A | * | 6/1999 | Barahia | H02K 7/08 |
| | | | | | 310/71 |
| 6,670,733 | B2 | * | 12/2003 | Melfi | H02K 11/01 |
| | | | | | 310/68 R |
| 6,844,642 | B2 | | 1/2005 | Tashiro | 310/90 |
| 7,592,726 | B2 | | 9/2009 | Heyder | 310/90 |
| 8,488,293 | B2 | | 7/2013 | Baumann | 361/222 |
| 2001/0030476 | A1 | * | 10/2001 | Brown | H02K 7/083 |
| | | | | | 310/90 |
| 2006/0152096 | A1 | * | 7/2006 | Helmi | H02K 5/15 |
| | | | | | 310/90 |
| 2012/0234950 | A1 | * | 9/2012 | Hammer | F16C 35/02 |
| | | | | | 241/46.013 |

FOREIGN PATENT DOCUMENTS

| CN | 102742085 A | 10/2012 | F16C 19/49 |
|---|---|---|---|
| DE | 20106984 U1 | 9/2001 | H02K 5/173 |
| DE | 10162818 A1 | 6/2003 | H02K 11/00 |
| DE | 10152360 B4 | 2/2005 | H02K 5/173 |
| WO | 2015/044034 A2 | 4/2015 | H02K 11/40 |

OTHER PUBLICATIONS

International Search Report and Written Opinion, Application No. PCT/EP2014/069936, 23 pages, dated May 20, 2015.

Chinese Office Action, Application No. 201480052687.1, 13 pages, dated Sep. 5, 2017.

* cited by examiner

ELECTRIC MACHINE AND CONNECTING UNIT FOR AN ELECTRIC MACHINE

CROSS-REFERENCE TO RELATED APPLICATIONS

This application is a U.S. National Stage Application of International Application No. PCT/EP2014/069936 filed Sep. 18, 2014, which designates the United States of America, and claims priority to DE Application No. 10 2013 219 186.3 filed Sep. 24, 2013, the contents of which are hereby incorporated by reference in their entirety.

TECHNICAL FIELD

The present disclosure relates to an electric machine, in particular a synchronous machine of a hybrid or electric vehicle, and a connecting unit for producing an electrically conductive connection to a rotor unit of an electric machine.

BACKGROUND

An electric machine, in particular a synchronous machine for a hybrid or electric vehicle, usually comprises a stator unit and a rotor unit, which can be rotated in relation to the stator unit, as well as a housing for receiving the stator unit and the rotor unit. Such an electric machine may be used for driving a vehicle and during operation can produce a nominal power of, for example, up to 35 kW and a peak power of, for example, up to 70 kW.

Due to the design and operating mode of an electric machine, during operation eddy currents are produced in the rotor unit of the electric machine and therefore an induction voltage builds up during operation of the electric machine until it abruptly dissipates in the form of an electric discharge via a mounting of the rotor unit or a shaft toothed structure of a rotor shaft of the electric machine. In so doing, such an electric discharge can cause electro erosive wear on working bodies of the mounting or on tooth flanks of the shaft toothed structure or so-called zebra stripe patterns on the working bodies or the tooth flanks and consequently damage the mounting or the shaft toothed structure.

SUMMARY OF THE INVENTION

It is therefore the object of the present disclosure to provide effective protection for the electric machine from the aforesaid electric discharge as a result of the aforesaid eddy currents.

In some embodiments, an electric machine may comprise a rotor unit and a housing for receiving the rotor unit. The rotor unit is designed to be rotatable about an axis of rotation and in relation to the housing, and has a rotor shaft and a first sliding surface for producing an electrically conductive sliding contact having a connecting unit to be described in detail hereinafter.

The electric machine additionally comprises the aforementioned connecting unit, which is designed for producing an electrical connection between the rotor unit and an electrically conductive component of the electric machine. In this context, the electrically conductive component can, for example, be the housing of the electric machine or a component of the housing such as, for example, an end shield, which is designed to be electrically connectable to an electrical ground. The aforesaid eddy currents can be led away from the rotor unit via the connecting unit between the rotor unit and the electrically conductive component before they cause damage at the rotor unit.

To this end, the connecting unit comprises a carrier part made of an electrically conductive material, which at least partially surrounds the rotor shaft circumferentially and which is mechanically firmly connected to the housing, in particular in a torque-proof manner. Further, the connecting unit comprises a contact part made of an electrically conductive material, which has a second sliding surface for producing the electrically conductive sliding contact. In addition, the connecting unit comprises a spring part made of an electrically conductive material, which also surrounds the rotor shaft circumferentially and at least partially. The spring part is further connected to the carrier part and the contact part in an electrically conductive and physically firm manner, and is designed to press the contact part in the direction of the axis of rotation against the first sliding surface of the rotor unit so that the first sliding surface of the rotor unit and the second sliding surface of the contact part form the aforesaid electrically conductive sliding contact.

The electric machine may be effectively protected from damage by the eddy currents if the eddy currents are led away from the rotor unit as far as possible directly after their formation.

In order to lead the eddy currents away from the rotor unit as far as possible directly after their formation, a direct electrical connection may be made from the rotor unit rotating in relation to the housing during operation of the electric machine to an electrical ground which is usually stationary in relation to the housing, which can behave stably even at a rotational speed of the electric machine of several thousand revolutions per minute.

An electrical connection by means of a contact designed radially to the rotor unit or the rotor shaft has proved to be costly and prone to failure. In addition, such a contact is not suitable for retrofitting to an already existing electric machine since this usually requires a complex and costly constructive modification inside the electric machine and in addition, requires a large installation space in the electric machine, which is not usually available.

Thus, an electric connecting unit with a contact implemented axially to the rotor unit may be produced cost-effectively and in addition, is failure-resistant and can be retrofitted. In this context, it has proved to be particularly advantageous in terms of failure resistance if the electrical connecting unit is designed to circumferentially surround the rotor shaft, i.e., at least partially completely in the circumference thereof. In addition, it was identified that an electrical connection via an electrically conductive sliding contact is particularly failure-resistant.

In this context, the carrier part of the connecting unit, which is configured to surround the rotor shaft circumferentially and at least partially, enables a failure-free hold of the connecting unit on the electric machine. The contact part, which produces an electrically conductive sliding contact with the rotor unit over a sliding surface, enables a stable electrical contact between the connecting unit and the rotor unit even during operation of the electric machine. The spring part, which connects the carrier part and the contact part to one another in an electrically conductive and physically firm manner and in addition presses the contact part in the direction of the axis of rotation against the sliding surface of the rotor unit, therefore maintains the stable electrically conductive sliding contact between the contact part of the connecting unit and the rotor unit.

Since the electrical connection or the connecting unit for producing this electrical connection can be built in the direction of the axis of rotation and therefore axially into the electric machine, if required this can also be retrofitted and/or replaced. The reason is that the remaining components of the electric machine are almost all assembled in the direction of the axis of rotation and therefore axially and therefore can also easily be dismounted axially and mounted again axially.

As a result, an electric machine with an electric connecting unit is provided by means of which the eddy currents can be led away from the rotor unit of the electric machine reliably and efficiently. The electric machine can thus be effectively protected from the eddy currents. In this context, the term "rotor unit" is preferably understood as a unit of the electric machine, which in addition to the rotor shaft and a rotor sheet package, comprises further components, which are connected to the rotor shaft in a torque-proof manner and therefore during operation of the electric machine rotate together with the rotor shaft in relation to the housing or a stator unit of the electric machine. For example, the rotor unit also comprises the inner race of a roller bearing such as, for example, the inner race of a floating bearing.

In some embodiments, the first sliding surface is annular and lying perpendicular to the axis of rotation. The term "perpendicular" in this context means that taking into account manufacturing tolerances and slight unevenesses caused by the production, the sliding surface lies largely perpendicular to the axis of rotation of the rotor unit.

Such a sliding surface ensures a stable electrical sliding contact which runs homogeneously over an entire angle-of-rotation range of the rotor unit and thus ensures a stable electrical connection.

In some embodiments, the carrier part is annular-disk-shaped. In this context, the carrier part preferably completely surrounds the rotor shaft of the rotor unit. This is advantageous for a stable fastening of the connecting unit on the housing of the electric machine since the connecting unit can be fastened on the housing over the entire annular circumference of the carrier part when viewed in the direction of the axis of rotation.

In some embodiments, the spring part is configured to be horseshoe-shaped. In some embodiments, the spring part has a first and a second end region, wherein the spring part is firmly connected to the carrier part via this first and this second end region. When viewed in the direction of the axis of rotation, the carrier part thus completely surrounds the spring part.

In some embodiments, the spring part has a central region, on which the contact part is firmly connected. In this context, the spring part presses the contact part in the direction of the axis of rotation away from the carrier part against the first surface of the rotor unit.

The three last-mentioned features may impart additional stability to the connecting unit.

In some embodiments, the carrier part and the spring part are configured in one piece. In this case, these two parts can easily and cost-effectively be cut out, such as for example, stamped, from a metal sheet.

In some embodiments, the electric machine has a roller bearing with an inner race for mounting the rotor shaft, wherein the inner race of the roller bearing is configured as a part of the rotor unit and has the aforesaid first sliding surface for producing the electrically conductive sliding contact with the contact part. In this case, a surface of the inner bearing forms the first sliding surface, which lies perpendicular to the axis of rotation and therefore facing the connecting unit.

In some embodiments, the roller bearing has an outer race, which is firmly connected to the housing. Further, the electric machine has a spring unit, in particular a disk spring, between the outer race of the roller bearing and the carrier part of the connecting unit, which presses the carrier part in the direction of the axis of rotation away from the outer race of the roller bearing against the housing. In this case, the disk spring presses the carrier part against the housing in its entire annular circumference so that a stable mechanical connection is ensured between the carrier part and therefore the connecting unit and the housing.

In some embodiments, a connecting unit for producing an electrically conductive connection to a rotor unit of an electric machine, which can be rotated about an axis of rotation, is provided, wherein the rotor unit comprises a rotor shaft and a first sliding surface for producing an electrically conductive sliding contact. At the same time, the connecting unit comprises a carrier part made of an electrically conductive material, which is configured to be able to surround the rotor shaft circumferentially at least partially, a contact part made of an electrically conductive material, which has a second sliding surface for producing the electrically conductive sliding contact, as well as a spring part made of an electrically conductive material, which is configured to be able to surround the rotor shaft circumferentially at least partially. The spring part is connected to the carrier part and the contact part in an electrically conductive and physically firm manner and is additionally designed to press the contact part in the direction of the axis of rotation against the first sliding surface of the rotor unit in such a manner that the first sliding surface and the second sliding surface form the electrically conductive sliding contact.

BRIEF DESCRIPTION OF THE DRAWINGS

Advantageous embodiments of the electric machine described above, insofar as these can also be applied to the aforesaid connecting unit, should also be considered to be advantageous embodiments of the connecting unit.

An exemplary embodiment of the present invention will now be explained in detail hereinafter with reference to the appended drawing. In the figures.

DETAILED DESCRIPTION OF THE DRAWINGS

Figure 1:
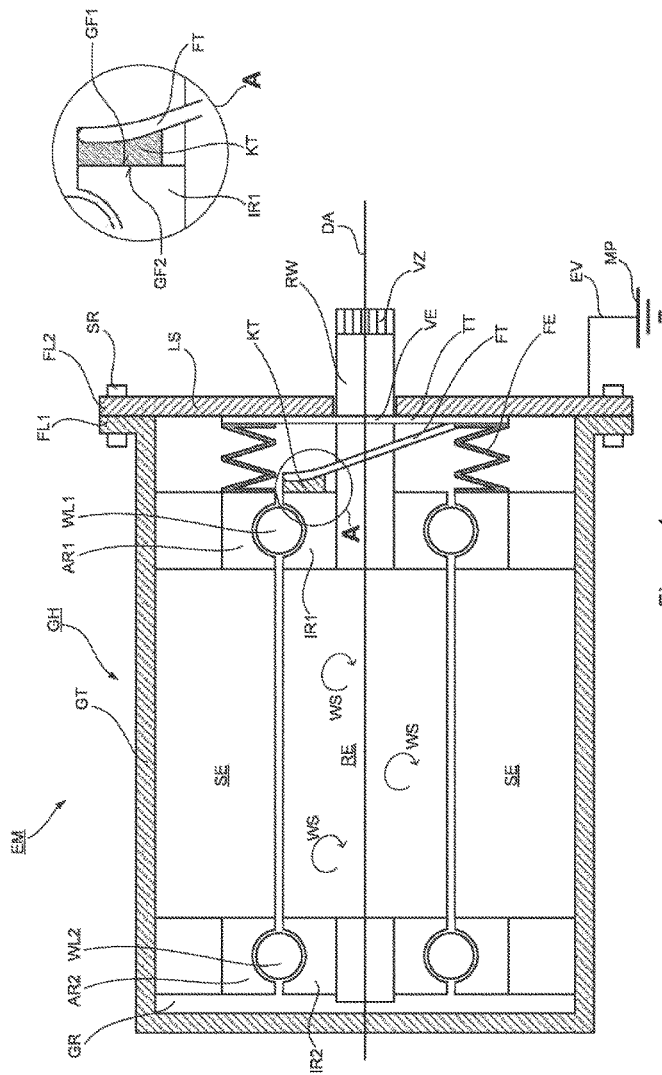
FIG. 1 shows in a schematic cross-sectional view an electric machine according to one embodiment of the invention.

FIG. 1 shows an electric machine EM for an electric vehicle not shown in the figure in a schematic cross-sectional view.

The electric machine EM comprises a housing GH, a stator unit SE, a rotor unit RE. In this embodiment, the housing GH comprises a trough-shaped housing part GT, which encloses a housing interior GR apart from an opening, and an end plate LS, which closes the opening of the trough-shaped housing part GT on one side and thus seals the housing interior GR with respect to a housing environment.

The housing part GT has a first flange FL1 configured to run around the housing part GT on a side facing the end plate LS. Similarly, the end plate LS has a second flange FL2 configured to run around the end plate LS and corresponding to the first flange FL1. The first and the second flange FL1, FL2 are firmly connected to one another by means of a number of screws SR. Thus, the end plate LS is fastened to the housing part GT and seals the housing interior GR with respect to the housing environment.

The end plate LS consists of an electrically conductive material and is connected to an electrical ground terminal MP on the vehicle by means of an electrical connection EV such as an electrical cable.

In the housing interior GR, the electric machine EM has a stator unit SE, which is fastened in a torque-proof manner on the trough-shaped housing part GT. In the housing interior GR the electric machine EM further comprises a rotor unit RE, which is mounted in a manner known to the person skilled in the art between the housing part GT and the end plate LS in relation to the housing GH and therefore in relation to the stator unit SE and can be rotated about an axis of rotation DA.

The rotor unit RE comprises a rotor shaft RW, which is mounted rotatably with a first roller bearing WL1 and a second roller bearing WL2.

At the same time, the second roller bearing WL2 is configured as a solid bearing and comprises an inner race IR2 and an outer race AR2. The rotor shaft RW is mounted in a torque-proof manner on the inner race IR2 and rotatably with respect to the outer race AR2. The second roller bearing WL2 is fixed firmly on the housing part GT via the outer race AR2.

The first roller bearing WL1 on the other hand is configured as a floating bearing and is pressed firmly in the direction of the axis of rotation DA against the second roller bearing WL2 by means of a spring unit FE configured as a disk spring.

The rotor shaft RW is partially guided outwards through an opening on the end plate LS from the housing interior GR and at an end lying outside the housing interior GR has a toothed structure VZ which, with a toothed structure of a drive shaft of the electric vehicle not shown in the figure, forms a toothed transmission for transmission of the torque of the electric machine EM.

During operation of the electric machine EM, the stator unit SE produces a rotating magnetic field in a manner known to the person skilled in the art, under the action of which the rotor unit RE rotates in a manner known to the person skilled in the art and thus produces a torque, which is transmitted by the rotor shaft RW to the drive shaft of the electric vehicle for driving the electric vehicle. Due to the design, during operation of the electric machine EM eddy currents WS and, therefore, an induction voltage are produced in the rotor unit RE, which builds up during operation of the electric machine until it dissipates abruptly in the form of an electric discharge via the roller bearings WL1, WL2 or the toothed structure VZ.

In this case, such an electric discharge can result in damage to the roller bearings WL1, WL2 or to the toothed structure VZ.

In order to lead these eddy currents WS away from the rotor unit RE directly after their formation and thus protect the electric machine EM from possible damage due to the eddy currents WS, the electric machine EM has a connecting unit VE between the first roller bearing WL1 and the end plate LS, which connecting unit electrically connects the rotor unit RE to the end plate LS and therefore to the electric ground connection MP.

Figure 2:
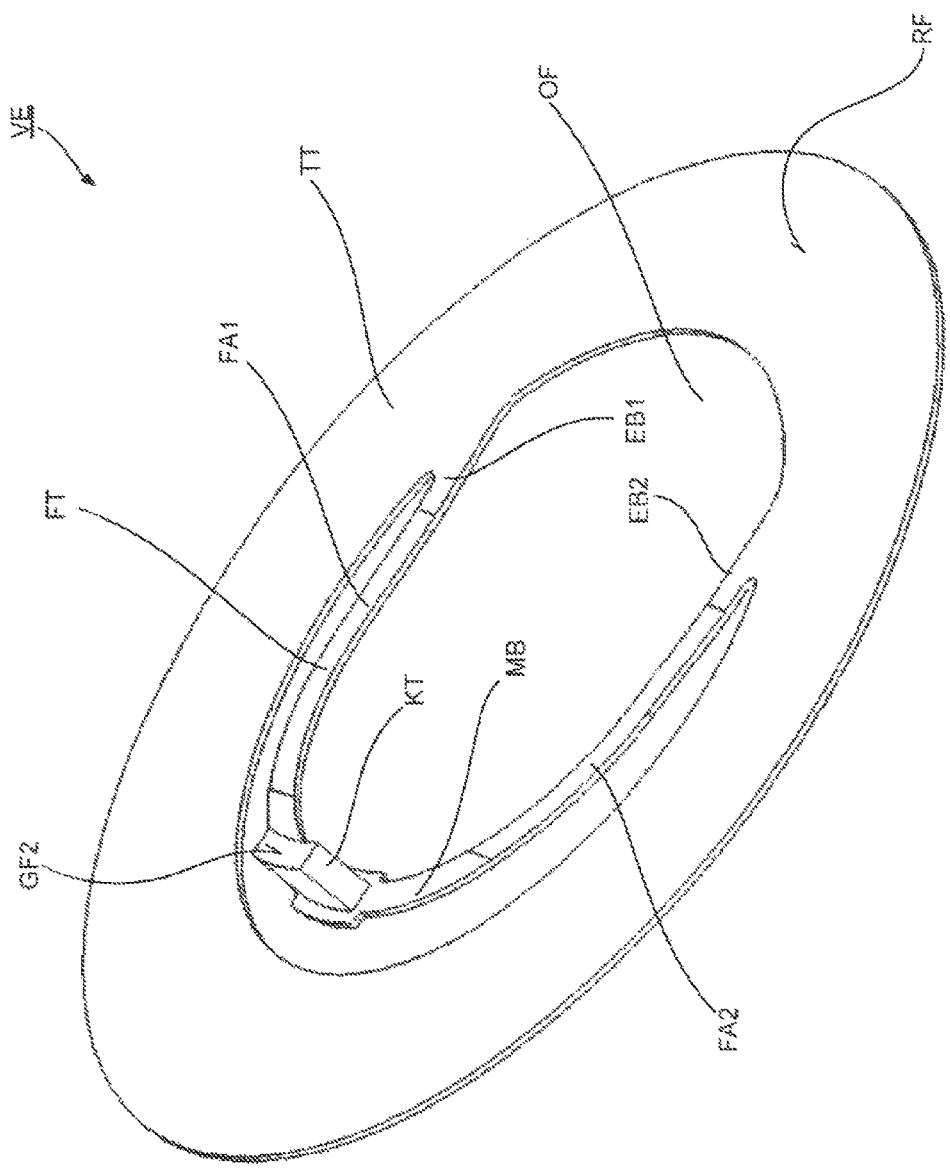
FIG. 2 shows in a perspective view a connecting unit of the electric machine according to the embodiment shown in FIG. 1.

This connecting unit VE is illustrated in the perspective view in FIG. 2. Accordingly, the connecting unit VE comprises a carrier part TT, a spring part FT, and a contact part KT made of electrically conductive materials. The carrier part TT and the spring part FT are cut or stamped in one piece from a metal sheet. The carrier part TT is in this case configured to be annular-disk-shaped and has an annular ring surface RF. In the middle of the ring surface RF the carrier part TT has an opening OF, through which the rotor shaft RW can be guided when assembling the electric machine EM.

The spring part FT is configured to be horseshoe-shaped or C-shaped and comprises a first end region EB1 and a second end region EB2, which each form a transition region from the carrier part TT to the spring part FT. Between the first and the second end region EB1, EB2 the spring part FT has a central region MB, on which the contact part KT is connected in an electrically conductive and firm manner. When viewed in the direction perpendicular to the ring surface RF of the carrier part TT, the spring part FT is completely surrounded or bordered by the carrier part TT. When viewed in the direction parallel to the ring surface of the carrier part TT, the spring part FT, in particular the central region MB of the spring part FT, projects resiliently together with the contact part KT from the plane of the ring surface RF of the carrier part TT.

The contact part KT is disposed on the central region MB of the spring part FT and on a surface of the central region MB facing away from the carrier part TT when viewed perpendicular to the ring surface RF and is connected in an electrically conductive and physically firm manner to the spring part FT. The contact part KT is configured to be rectangular and has a second sliding contact surface GF2 on a side facing away from the spring part FT, which after assembly of the electric machine EM forms the aforesaid electrical sliding contact with the first sliding contact surface GF1 on the inner race IR1 of the first roller bearing WL1.

It is now described in detail again by reference to FIG. 1 where and how the connecting unit VE is disposed in the electric machine EM and how this leads the previously described eddy currents WS away from the rotor unit RE and thus protects the rotor unit RE from damage by the eddy currents WS.

Thus, as depicted schematically in FIG. 1, the connecting unit VE is disposed between the first roller bearing WL1 and the end plate LS and centrally to the axis of rotation DA and therefore the rotor shaft RW, wherein the rotor shaft RW projects through the opening OF in the center of the carrier part TT. The carrier part TT thus borders the rotor shaft RW. The carrier part TT is in addition physically and electrically conductively contacted by the end plate LS. The disk spring FE is disposed between the carrier part TT and the roller bearing WL1, which disk spring presses the first roller bearing WL1 configured as a floating bearing and thus the rotor unit RE in the direction of the axis of rotation DA against the second roller bearing WL2 configured as a solid bearing. As a result of its spring effect, the disk spring FE at the same time presses the carrier part TT in the direction of the axis of rotation DA against the end plate LS and thus maintains the electrical contact between the carrier part TT and the end plate LS.

The spring part FT, which projects resiliently from the plane of the ring surface RF of the carrier part TT, presses the contact part KT in the direction of the axis of rotation DA against the inner race IR1 of the first roller bearing WL1, so that the second sliding contact surface GF2 of the contact part KT is pressed against the first sliding contact surface GF1 of the inner race IR1. Thus, these two sliding contact surfaces GF1, GF2 form the electrically conductive sliding contact, which holds stably even during a rotation of the rotor unit RE with a high rotational speed, as illustrated in a sectional view A.

Via this sliding contact between the first and the second sliding surface GF1, GF2, the eddy currents WS induced in the rotor unit RE can be led away to the contact part KT or the connecting unit VE and then from the connecting unit VE via the end plate LS and the electrical connection EV to the electrical ground connection MP and made harmless.

It is now described with reference to FIG. 3 how the electric machine EM together with the connecting unit VE is assembled and if necessary dismounted again.

Figure 3:
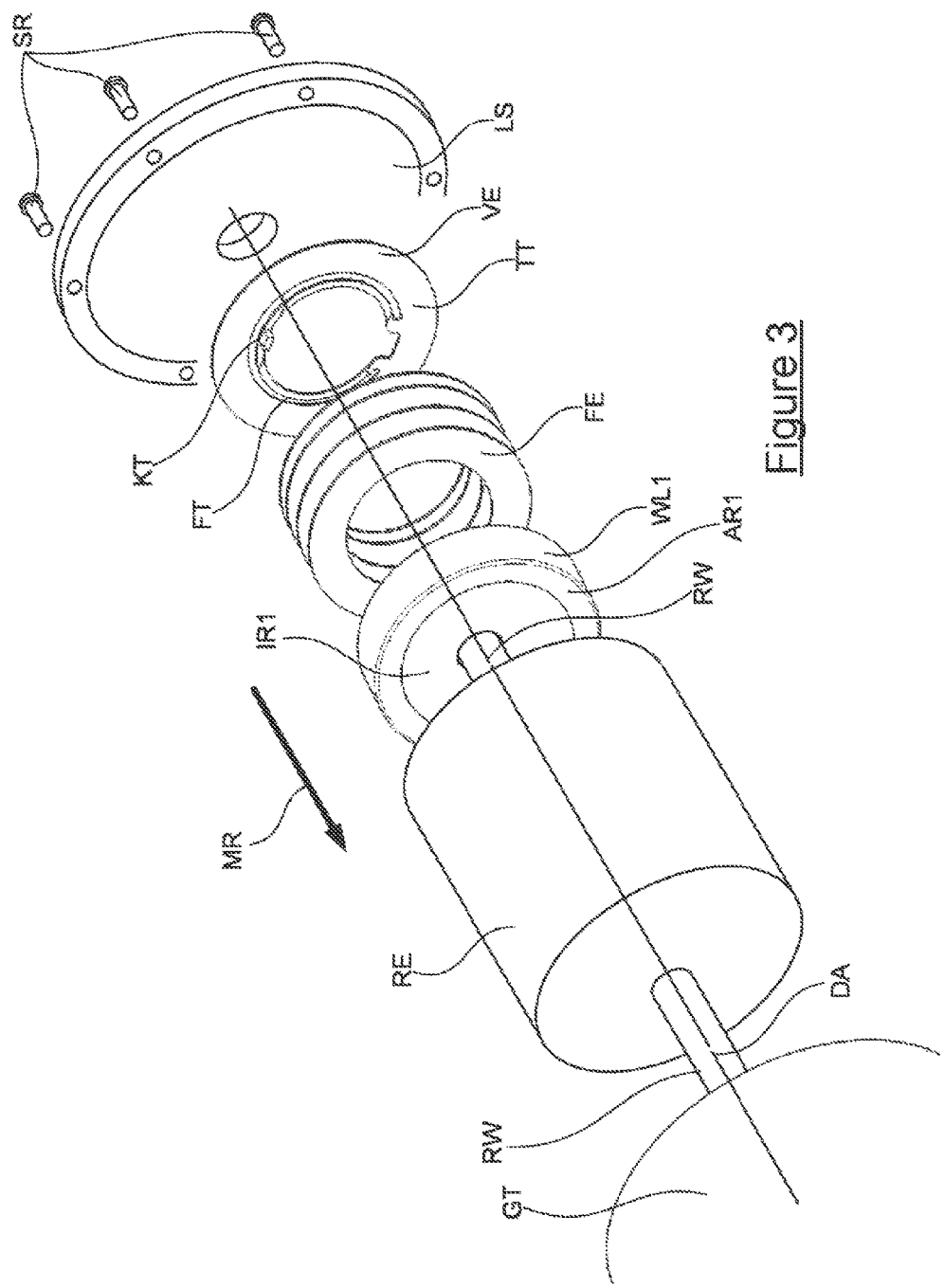
FIG. 3 shows in an exploded view components of the electric machine according to the embodiment shown in FIG. 1.

In this context, FIG. 3 shows a section of the housing part GT, the rotor unit RE together with the rotor shaft RW, the first roller bearing WL1, the disk spring FE, the connecting unit VE, and the end plate LS in an exploded view.

When assembling the electric machine EM, firstly the second roller bearing WL2 and the stator unit SE are inserted successively into the housing interior GR of the housing part GT in a manner known to the person skilled in the art and fastened to the housing part GT. Then the rotor unit RE together with the rotor shaft RW, the first roller bearing WL1, the disk spring FE, and the connecting unit VE are inserted consecutively into the housing interior GR of the housing part GT in a mounting direction MR running parallel to the axis of rotation DA and accordingly centered with respect to one another and fastened to one another. At the same time, the inner race IR1 of the first roller bearing WL1 is pushed onto the rotor shaft RW and connected in a torque-proof manner to the rotor shaft RW. The outer race AR1 of the first roller bearing WL1 is on the other hand connected in a torque-proof manner to the housing part GT. Finally, the endplate LS is fastened by means of the screws SR to the housing part GT, wherein the rotor shaft RW is mounted rotatably on the end plate LS. The carrier part TT of the connecting unit VE is pressed by the disk spring FE against the end plate LS so that on the one hand, the connecting unit VE is held firmly between the disk spring FE and the end plate LS and on the other hand, a stable electrical connection is made from the connecting unit VE to the end plate LS.

The connecting unit VE can also be installed subsequently in a finished electric machine EM. To this end, it is merely necessary to dismount the end plate LS contrary to the mounting direction MR and push the connecting unit VE in the mounting direction MR behind the disk spring FE and then fasten the end plate LS again to the housing part GT.

What is claimed is:

1. An electric machine comprising:
   a housing for receiving a rotor unit,
   the rotor unit rotatable about an axis of rotation and having a rotor shaft and a first sliding surface for producing an electrically conductive sliding contact,
   a connecting unit for producing an electrical connection to the rotor unit comprising:
   a carrier part made of an electrically conductive material, at least partially surrounding the rotor shaft circumferentially and firmly connected to the housing,
   a contact part made of an electrically conductive material, including a second sliding surface for producing the electrically conductive sliding contact,
   a spring part made of an electrically conductive material, at least partially surrounding the rotor shaft circumferentially, connected to the carrier part and the contact part in an electrically conductive and firm manner, and pressing the contact part in the direction of the axis of rotation against the first sliding surface so the first sliding surface and the second sliding surface form the electrically conductive sliding contact.

2. The electric machine as claimed in claim 1, wherein the first sliding surface has an annular shape lying perpendicular to the axis of rotation.

3. The electric machine as claimed in claim 1, wherein the carrier part is annular-disk-shaped.

4. The electric machine as claimed in claim 1, wherein the spring part is horseshoe-shaped.

5. The electric machine as claimed in claim 4, wherein:
   the spring part includes a first end region and a second end region, wherein the spring part is firmly connected to the carrier part via the first and the second end region, and
   the carrier part surrounds the spring part when viewed in the direction of the axis of rotation.

6. The electric machine as claimed in claim 5, wherein
   the spring part has a central region between the first and the second end region, on which the contact part is firmly connected, and
   the spring part presses the contact part in the direction of the axis of rotation away from the carrier part against the first sliding surface.

7. The electric machine as claimed in claim 1, wherein the carrier part and the spring part are integrated in a single piece.

8. The electric machine as claimed in claim 1, wherein:
   the electric machine a roller bearing with an inner race for mounting the rotor shaft, and the inner race is part of the rotor unit and includes the first sliding surface for producing the electrically conductive sliding contact.

9. The electric machine as claimed in claim 8, wherein:
   the roller bearing includes an outer race, which is firmly connected to the housing, and
   further comprising a spring unit between the outer race and the carrier part, the spring unit pressing the carrier part in the direction of the axis of rotation away from the outer race against the housing.

10. A connection unit for providing an electrically conductive connection to a rotor unit of an electric machine, rotating about an axis of rotation, the electric machine including a rotor shaft and a first sliding surface for producing an electrically conductive sliding contact, the connection unit comprising:
    a carrier part made of an electrically conductive material, surrounding the rotor shaft circumferentially at least partially,
    a contact part made of an electrically conductive material, including a second sliding surface for producing the electrically conductive sliding contact,
    a spring part made of an electrically conductive material, surrounding the rotor shaft circumferentially at least partially and connected to the carrier part and the contact part in an electrically conductive and firm manner, and to press the contact part in the direction of the axis of rotation against the first-sliding surface so the first sliding surface and the second sliding surface form the electrically conductive sliding contact.

* * * * *